Oct. 19, 1965   K. M. ALLEN ETAL   3,212,630
RECIPROCATING CONVEYOR
Filed April 26, 1963
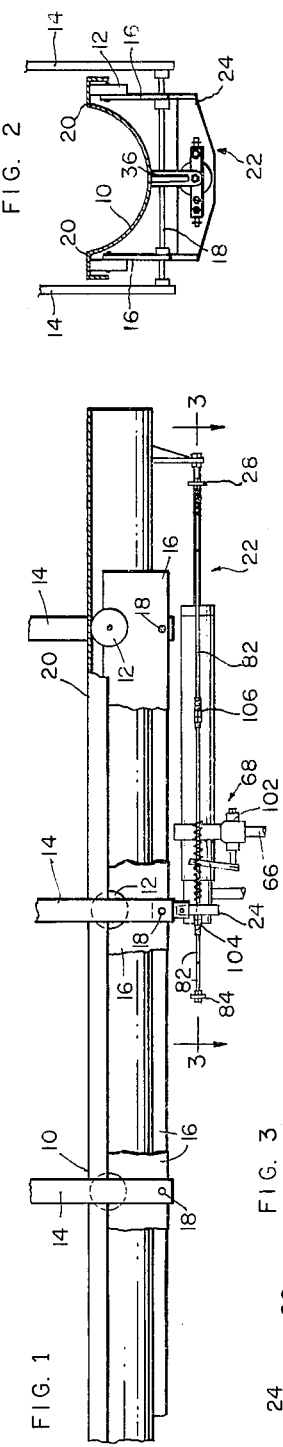
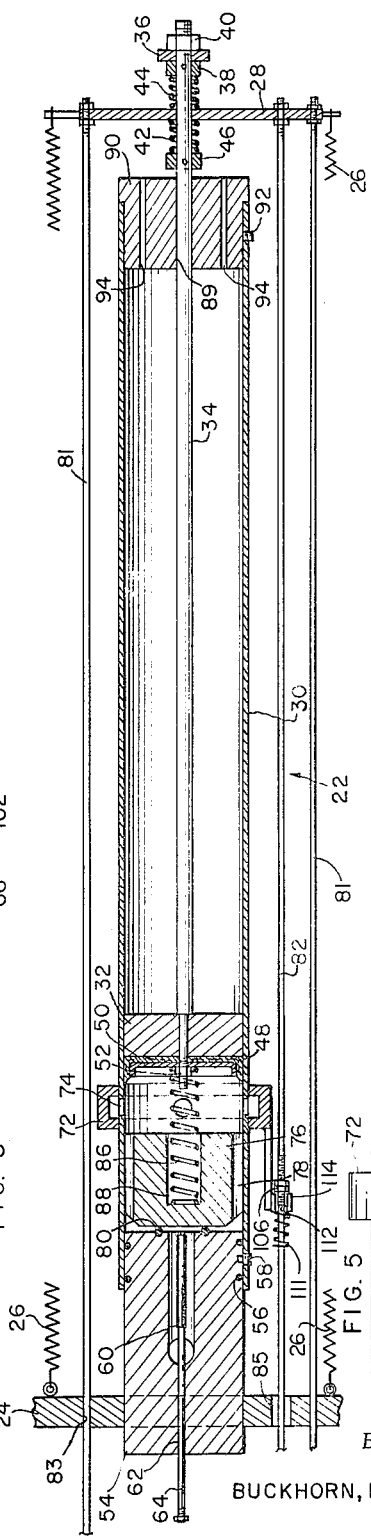
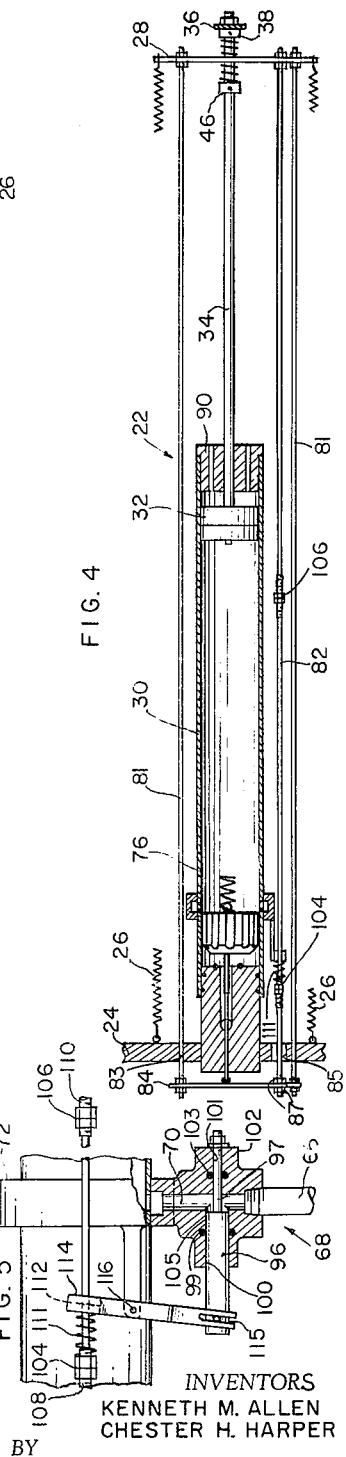
INVENTORS
KENNETH M. ALLEN
CHESTER H. HARPER
BY
BUCKHORN, BLORE, KLARQUIST & SPARKMAN
ATTORNEYS United States Patent Office 3,212,630
Patented Oct. 19, 1965

3,212,630
RECIPROCATING CONVEYOR
Kenneth M. Allen and Chester H. Harper, both of
P.O. Box 352, Newberg, Oreg.
Filed Apr. 26, 1963, Ser. No. 275,904
12 Claims. (Cl. 198—220)

This invention relates to a reciprocating conveyor, and more particularly to a reciprocating conveyor having a slow feed stroke and a rapid return stroke.

Reciprocating conveyors known in the past usually include an elongated conveyor member driven by a reciprocating mechanism through a feed stroke in which the conveyor member carries material thereon in a feed direction followed by a retraction stroke in which the conveyor is moved back in the opposite direction with sufficient rapidity that the material breaks loose from the conveyor and is not returned during the retraction stroke. In the reciprocating drives of conveyors of this type, it is important to stop the movement of the conveyor in its feed direction very sharply and to retract the conveyor in its retraction stroke with a snap action so that the friction between the material and the conveyor is broken, and the conveyor does not pull the material materially back therewith in the retraction stroke of the conveyor. Hitherto, there has been no satisfactory, maintenance-free and simple drive for the conveyor member which provided the snap action change from the feed to the retraction stroke.

An object of the invention is to provide a reciprocating conveyor with a reciprocating drive which has a snap action from the feed stroke thereof to the retraction stroke thereof.

Another object of the invention is to provide a reciprocating conveyor having a highly effective maintenance-free reciprocating drive involving a minimum number of parts.

Another object of the invention is to provide a reciprocating conveyor drive adapted to automatically vary the stroke thereof in accordance with the load being conveyed thereby.

The present invention provides a reciprocating conveyor having a reciprocable conveyor member which is moved slowly in a feed direction and is rapidly reversed and retracted in a retraction stroke with a snap action to jerk free of the material being fed thereby so as not to impede the movement of the material in the feed direction. The drive of the conveyor member preferably includes a cylinder extending beneath the conveyor member and mounting a piston connected to the conveyor member by a piston rod for moving the conveyor member in the retraction stroke thereof, with spring means for moving the conveyor in its feed stroke. Valving means may be provided to supply air under pressure into the cylinder just before the conveyor reaches the end of its feed stroke to cause a build-up of pressure in the cylinder as the end of the feed stroke of the conveyor member occurs. This causes a snap reversal of movement of the conveyor member. There may also be provided a pull rod carried by the piston and operative near the end of the return stroke of the piston to move a push rod through a guide passage in the end of the cylinder to engage a valve member and move the valve member away from an exhaust port in the end of the cylinder. This decreases the pressure of the air in the cylinder which has been driving the piston in its power stroke and permits springs stressed by the power stroke of the piston to move the piston back in its return stroke and drive the conveyor member at a slow speed at which friction between the conveyor member and the material on the conveyor is effective to move the material with the conveyor member. Near the end of this return stroke of the piston, the piston engages a compression spring of the valve member projecting therefrom and pushes the valve member from its open position to a position closing the exhaust port. During this latter portion of the stroke the pressure of air supplied to the cylinder continuously builds up to give a snap action start to the power stroke of the piston to retract the conveyor member rapidly in its retraction stroke and break the friction between the conveyor member and the material being fed. There may be provided a valve member operable by the pull rod at the end of the working stroke of the piston for controlling the flow of air to the cylinder in accordance with the length of the stroke of the piston and conveyor member to adjust the power supplied to the piston and cylinder to the load on the conveyor member. Since the stroke of the piston is longer when the conveyor is under a lighter load than when the conveyor member is under a heavier load, the valve member cuts down the rate of flow of air to the cylinder for the lighter load conditions.

A complete understanding of the invention may be obtained from the following detailed description of a reciprocating conveyor forming a specific embodiment thereof, when read in conjunction with the appended drawings, in which:

FIG. 1 is a fragmentary side elevation of a reciprocating conveyor forming one embodiment of the invention;

FIG. 2 is a transverse, vertical sectional view of the conveyor of FIG. 1;

FIG. 3 is an enlarged horizontal sectional view taken generally along line 3—3 of FIG. 1;

FIG. 4 is a view similar to FIG. 3 with portions thereof shown in different positions; and FIG. 5 is a fragmentary, partially sectional view of a portion of the apparatus of FIG. 1.

Referring now in detail to the drawings, there is shown therein an elongated, generally horizontal conveyor trough 10 reciprocable horizontally on supporting rollers 12 carried rigidly on frame plates 16 which are supported by the lower ends of pairs of links 14 suspended pivotally at the upper ends thereof from a rigid support (not shown). The rollers 12 are mounted rotatably on the plates 16, which are connected together by rods 18 carried by the lower ends of the links 14, and channel portions 20 of the trough 10 face downwardly and rest on the rollers 12 and are guided and supported thereby. The links 14, frame plates 16, the rods 18 and the rollers 20 form a floating bed for supporting the conveyor trough 10.

The conveyor trough 10 is reciprocated horizontally by a reciprocating drive 22 which is fastened at one end to a plate 24 rigidly connected to one pair of the links 14. The reciprocating drive 22 moves the conveyor trough 10 toward the left as viewed in FIG. 1, in a feed stroke at a rate of speed sufficiently slow that friction is maintained between the trough 10 and material carried thereby (not shown) to move the material toward the left as viewed in FIG. 1. Then, with a snap action, the drive 22 rapidly reverses the direction of the trough from a feed direction to a return or retracting direction in which the trough 10 is moved rapidly toward the right, and the transition from the feed stroke to the retraction stroke is fast and the initial portion of the retraction stroke of the trough 10 is fast so that the friction between the trough 10 and the material being conveyed thereby is broken as quickly as possible. Hence, any tendency of the trough 10 to move the material to the right, as viewed in FIG. 1, is avoided.

Tension springs 26 connected at their left hand ends, as viewed in FIG. 3, to the plate 24 and at their right hand ends to the plate 28 provide the driving force of the plate 28 to move the trough 10 in the feed stroke thereof. The trough 10 is driven in its retraction stroke by means of a pneumatic cylinder 30, a piston 32 and a piston rod 34. The outer or free end of the piston rod 34 carries a bar 36 rigidly connected to the trough 10 and rigidly connected to the rod 34 by means of a stop collar 38 and a nut 40, the stop collar 38 being pinned rigidly to the piston rod 34. The plate 28 is mounted slidably on the piston rod 34 between compression springs 42 and 44 positioned respectively between collars 46 and 38 pinned rigidly to the piston rod and the plate 28. This forms a resilient coupling between the plate 28 and the piston rod. At the left hand end of the piston rod 34, as viewed in FIG. 3, there is provided a sealing leather or cup-shaped disc 48 with a rigid backing plate 50 and the disc and plate are secured to the end of the piston 32 by a nut 52 threaded on the left hand end of the reduced left hand end portion of the piston rod 34.

An end plug 54 closes the left hand end of the cylinder 30 and is mounted rigidly on the plate 24. O-ring seals 56 are carried by the plug 54 and a setscrew 58 connects the cylinder 30 rigidly to the plug 54. The plug 54 has an L-shaped exhaust port 60 communicating with the interior of the cylinder 30 at the left hand end of the cylinder 30 and with the atmosphere at its other end. The plug 54 also has a guide bore 62 therein serving to guide a push rod 64 aligned with and of a substantially smaller diameter than the bore 62. Air is supplied continuously into the left hand end portion of the cylinder 30 from a source of air under pressure (not shown) connected by flexible conduit means (not shown) to a conduit 66 leading to an adjustable orifice valve 68 (FIG. 5) having a passage 70 therein connecting the conduit 66 to a manifold 72 leading to inlet ports 74. The air is continuously supplied into the left hand end portion of the cylinder 30 at a point along the cylinder 30 to the left of the extreme left hand movement of the piston 32.

When a piston-like valve member 76 provided with fluted air passages 78 extending along the periphery thereof abuts an O-ring 80 surrounding the exhaust port 60, the air supplied to the left hand end of the cylinder is maintained under a high, driving pressure and drives the piston 32 toward the right, as viewed in FIG. 3, in a power stroke to move the conveyor trough 10 rapidly to the right in its retraction stroke, and also moves the plate 28 and pull rods 81 and 82 fastened to the plate 28 and slidably mounted in bores 83 and 85 in the plate 24 to the right. The left hand ends of the pull rods 81 are connected adjustably to a plate 84 by nuts 87 (FIG. 4) mounted on the threaded ends of the pull rods 82. As the piston 32 is moved in its power stroke toward the right and approaches the end of its power stroke, in which position it is shown in FIG. 4, the plate 84 engages the push rod 64 to push the push rod into engagement with the piston-like valve member 76 and push the valve member 76 away from the O-ring 80 to open the exhaust port 60. This immediately drops the pressure of the air in the cylinder 30 to only slightly above that of the atmosphere, and drive of the piston 32 toward the right stops. The conveyor trough 10 and the piston 32 travel slightly farther to the right because of inertia and then are stopped by the action of the springs 26 which move the trough 10 in its feed stroke to the left to the position of the piston 32 shown in FIG. 3.

Near the end of the idle or return stroke of the piston 32, the plate 50 engages a compression spring 86 having one end fixed and seated in a bore 88 in the right hand end of the valve member 76 and moves the member 76 into engagement with the O-ring 80, and then travels on farther to the left compressing the spring 86. As soon as the valve member 76 engages the O-ring 80, pressure of the air being supplied into the left hand end of the cylinder 30 begins to build up rapidly, and by the time the piston 32 arrives at the extreme of its left hand travel, the action of the air to the left of the piston 32 gives a snap action to reverse the direction of movement of the piston 32 to jerk the trough 10 out from under the material which had been conveyed thereby, immediately breaking the friction therebetween. This provides a fast start to the power stroke of the piston 32 to rapidly begin the retraction of the trough 10 and the high speed is maintained during the ensuing remainder of the retraction stroke of the trough. The piston rod 34 is slidable in a bore 89 formed in an end plug 90 fastened to the right hand end of the cylinder 30 by a setscrew 92. The plug 90 has suitable vent holes 94 to permit the free passage of air therethrough to and from the interior of the cylinder 30.

In order to provide an optimum length of stroke of the trough 10, regardless of whether the trough 10 has a very heavy load therein or a very light load therein, the valve 68 is provided. Air under a pressure sufficient to drive the conveyor trough while carrying its heaviest load is continuously supplied to the valve 68 by the conduit 66, and this pressure for lighter loads than the heaviest load is reduced by the valve 68 in proportion to the lessening of the load. This is effected by lost motion actuation of a valve rod or closure member 96 slidable in bores 100 and 101 in a valve casing 102 of the valve 68. The rod 96 has a reduced diameter portion 97, and O-rings 99 and 103 seal the rod in the bores 100 and 101. The rod 96 has an enlarged diameter portion 105 adapted to close the passage 70 to the extent the portion 105 projects into the passage 70. When the load on the conveyor trough 10 is at a maximum, the conveyor trough 10 stroke is slightly shorter at its left hand position than when there is a lesser load on the conveyor trough. A pair of actuating nuts 104 and 106 are mounted adjustably on threaded portions 108 and 110 of the rod 82, which extends through a slot 112 in a lever 114. A compression spring 111 is positioned between the nut 104 and the lever 114. The lever 114 is connected by a pin-and-slot connection 115 to the valve closure member 96, and is mounted pivotally on a pin 116. At the end of each work stroke of the piston 32, the nut 104 engages the lever 114 and moves it to its fully open position completely out of the passage 70 in the valve 68. If the load is heavy, at the end of the return stroke, the nut 106 does not quite engage the lever 114 and the valve 68 remains fully open during the work stroke. If the conveyor load is light, the return stroke of the piston is longer and the nut 106 engages the lever 114 and moves the enlarged portion 105 of the member 96 into the passage 70 and closes the passage 70 to an extent in accordance with the lightness of the load. Thus, for heavy loads, the valve is fully open to supply maximum driving pressure and for lesser loads, the valve reduces the pressure of the air proportionately to the lessened load. However, since the load on the trough is lower, the speed of the power stroke of the piston during the lighter load is still as high as that during higher load conditions. It will be noted that, at the start of the buildup in pressure for reversal of the piston from its return movement to its power stroke, the valve is always fully open so that a strong snap action always occurs.

If desired, the O-ring 80 may be omitted and the piston-like valve member instead of being constructed of a metal such as, for example, aluminum, may be molded from a known semiresilient plastic material with an annular, rounded sealing rib (not shown) adapted to seat sealingly against the end of the plug 54 and surrounded and close off the port 60.

The above described apparatus is highly efficient in its operation and is simple and rugged in its construction. Maintenance of the apparatus is minimum. The apparatus provides a simple, effective mechanism for effecting snap action in reversing the conveyor trough 10, and adjusts the drive of the conveyor trough 10 automatically in accordance with the load on the conveyor trough.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a conveyor,
a conveyor member,
a cylinder having an outlet port in one end thereof,
a piston slidable in the cylinder between a first position adjacent to and spaced a predetermined distance from said one end and a second position adjacent the other end of the cylinder,
an inlet port in the cylinder adjacent said one end and outside of the range of sliding movement of the piston,
means supplying air under pressure to the inlet port,
a valve member slidable in the cylinder and adapted to close the outlet port when moved to said one end of the cylinder,
the valve member being movable by the piston to said one end of the cylinder as the piston approaches the first position thereof,
means drivingly connecting the piston to the conveyor member,
spring means urging the piston toward the first position thereof,
and means operable by the piston as the piston approaches the second position thereof for moving the valve member away from the outlet port.

2. In a conveyor,
a conveyor member,
a cylinder having an outlet port in one end wall thereof,
a piston slidable in the cylinder between a first position adjacent to and spaced a predetermined distance from said one end wall and a second position adjacent the other end of the cylinder,
an inlet port in the cylinder adjacent said one end wall and outside of the range of sliding movement of the piston,
means supplying air under pressure to the inlet port,
a valve member fitting slidably in the cylinder and adapted to be moved to said one end wall to close the outlet port,
the valve member being movable by the piston to said one end wall of the cylinder as the piston approaches the first position thereof,
means drivingly connecting the piston to the conveyor member,
spring means urging the piston toward the first position thereof,
and means operable by the piston as the piston approaches the second position thereof for moving the valve member away from the outlet port.

3. The conveyor of claim 2 including a compression spring carried by the valve member and extending toward the piston.

4. The conveyor of claim 2 wherein the valve member is provided with air passages in the portions of the periphery thereof adjacent the inlet port to keep the inlet port open at all times.

5. In a reciprocating conveyor,
an elongated, horizontal conveyor trough,
means mounting the trough for reciprocation along the longitudinal axis thereof,
a cylinder mounted under the trough and extending parallel thereto and provided with an exhaust port in one end thereof, a guide bore in said one end thereof, an inlet port in a side wall thereof spaced a predetermined distance from said one end and piston rod guide means at the other end thereof,
a piston reciprocable in the cylinder in a work stroke moving away from said one end of the cylinder and a return stroke moving toward said one end of the cylinder,
a piston rod connected at one end thereof to the piston and connected at the other end thereof to the trough and extending slidably through the guide means,
a pull rod,
resilient means connecting the pull rod to the portion of the piston rod extending out of the cylinder,
a peripherally fluted, piston-like valve member mounted slidably in the cylinder between the piston and said one end of the cylinder and adapted to close the exhaust port when pressed against said one end of the cylinder,
a compression spring carried by the valve member in a position extending from the valve member toward the piston for transmitting thrust from the piston to the valve member and provide for movement of the piston toward the valve member after engagement of the spring by the piston,
a push rod pulled by the pull rod and extending through the guide bore and adapted to push the valve member away from the exhaust port as the piston nears the end of its work stroke,
spring means urging the piston in its return stroke toward said one end of the cylinder
and air supply means for supplying air under a predetermined pressure to the inlet port.

6. In a reciprocating conveyor,
an elongated, horizontal conveyor trough,
means mounting the trough for reciprocation along the longitudinal axis thereof,
a cylinder mounted under the trough and extending parallel thereto and provided with an exhaust port in one end thereof, a guide bore in said one end thereof, an inlet port in a side wall thereof spaced a predetermined distance from said one end and piston rod guide means at the other end thereof,
a piston reciprocable in the cylinder in a work stroke moving away from said one end of the cylinder and a return stroke moving toward said one end of the cylinder,
a piston rod connected at one end thereof to the piston and connected at the other end thereof to the trough and extending slidably through the guide means,
a pull rod,
resilient means connecting the pull rod to the portion of the piston rod extending out of the cylinder,
a valve member mounted slidably in the cylinder between the piston and said one end of the cylinder and adapted to close the exhaust port when pressed against said one end of the cylinder,
resilient means carried by the valve member in a position extending from the valve member toward the piston for transmitting thrust from the piston to the valve member and provide for movement of the piston toward the valve member after engagement of the resilient means by the piston,
a push rod pulled by the pull rod and extending through the guide bore and adapted to push the valve member away from the exhaust port as the piston nears the end of its work stroke,
spring means urging the piston in its return stroke toward said one end of the cylinder,
and air supply means for supplying air under pressure to the inlet port.

7. In a reciprocating conveyor,
an elongated, horizontal conveyor trough,
means mounting the trough for reciprocation along the longitudinal axis thereof,
a cylinder mounted under the trough and extending parallel thereto and provided with an exhaust port in one end thereof, a guide bore in said one end thereof, an inlet port in a side wall thereof spaced a predetermined distance from said one end and piston rod guide means at the other end thereof,
a piston reciprocable in the cylinder in a work stroke moving away from said one end of the cylinder and a return stroke moving toward said one end of the cylinder,
a piston rod connected at one end thereof to the piston and connected at the other end thereof to the trough and extending slidably through the guide means,
a pull rod,
resilient means connecting the pull rod to the portion of the piston rod extending out of the cylinder,
a peripherally fluted, piston-like member mounted slidably in the cylinder between the piston and said one end of the cylinder and adapted to close the exhaust port when pressed against said one end of the cylinder,
a compression spring carried by the valve member in a position extending from the valve member toward the piston for transmitting thrust from the piston to the valve member and provide for movement of the piston toward the valve member after engagement of the spring by the piston,
a push rod pulled by the pull rod and extending through the guide bore and adapted to push the valve member away from the exhaust port as the piston nears the end of its work stroke,
a floating frame supporting the conveyor trough and the cylinder,
spring means extending along the pull rod and connected to the frame and the piston and urging the piston in its return stroke toward said one end of the cylinder,
and air supply means for supplying air under pressure to the inlet port.

8. In a reciprocating conveyor,
an elongated, horizontal conveyor trough,
means mounting the trough for reciprocation along the longitudinal axis thereof,
a cylinder mounted under the trough and extending parallel thereto and provided with an exhaust port in one end thereof, a guide bore in said one end thereof, an inlet port in a side wall thereof spaced a predetermined distance from said one end and piston rod guide means at the other end thereof,
a piston reciprocable in the cylinder in a work stroke moving away from said one end of the cylinder and a return stroke moving toward said one end of the cylinder,
a piston rod connected at one end thereof to the piston and connected at the other end thereof to the trough and extending slidably through the guide means,
a pull rod,
resilient means connecting the pull rod to the portion of the piston rod extending out of the cylinder,
a peripherally fluted, piston-like valve member mounted slidably in the cylinder between the piston and said one end of the cylinder and adapted to close the exhaust port when pressed against said one end of the cylinder,
a compression spring carried by the valve member in a position extending from the valve member toward the piston for transmitting thrust from the piston to the valve member and permit movement of the piston toward the valve member after engagement of the spring by the piston,
a push rod pulled by the pull rod and extending through the guide bore and adapted to push the valve member away from the exhaust port as the piston nears the end of the work stroke,
a floating frame supporting the conveyor trough and the cylinder,
spring means connected between the frame and the piston and urging the piston in its return stroke toward said one end of the cylinder,
air supply means for supplying air under a predetermined pressure,
valve means having a variable orifice connecting the air supply means to the inlet port of the cylinder,
and lost motion means operable by the piston for closing the valve means in accordance with the length of the feed stroke of the conveyor trough.

9. In a reciprocating conveyor,
a conveyor member,
a floating support bed,
roller means on the bed and carrying the conveyor member reciprocably thereon,
and pneumatic means mounted on the bed and connected between the bed and the conveyor member for reciprocating the conveyor member relative to the bed.

10. In a reciprocating conveyor,
a conveyor member,
a floating support bed,
roller means on the bed and carrying the conveyor member reciprocably thereon,
a plurality of pivotal links suspending the bed.
and pneumatic means mounted on the bed and connected between the bed and the conveyor member for reciprocating the conveyor member relative to the bed.

11. In a conveyor,
a conveyor member,
a cylinder having an outlet port in one end thereof,
a piston slidable in the cylinder between a first position adjacent to and spaced a predetermined distance from said one end and a second position adjacent the other end of the cylinder,
an inlet port in the cylinder adjacent said one end and outside of the range of sliding movement of the piston,
a valve member slidable in the cylinder and adapted to close the outlet port when moved to said one end of the cylinder,
the valve member being movable by the piston to said one end of the cylinder as the piston approaches the first position thereof,
means drivingly connecting the piston to the conveyor member,
means operable by the piston as the piston approaches the second position thereof for moving the valve member away from the outlet port,
air supply means for supplying air under a predetermined pressure,
adjustable reducing valve means connecting the air supply means to the inlet port of the cylinder,
and lost motion means operable by the piston for closing the valve means in accordance with the length of the feed stroke of the conveyor member.

12. In a conveyor,
a conveyor member,
a cylinder having an outlet port in one end thereof,
a piston slidable in the cylinder between a first position adjacent to and spaced a predetermined distance from said one end and a second position adjacent the other end of the cylinder,
an inlet port in the cylinder adjacent said one end and outside of the range of sliding movement of the piston,
a valve member slidable in the cylinder and adapted to close the outlet port when moved to said one end of the cylinder,
the valve member being movable by the piston to said one end of the cylinder as the piston approaches the first position thereof,
means drivingly connecting the piston to the conveyor member,
means operable by the piston as the piston approaches the second position thereof for moving the valve member away from the outlet port,
air supply means for supplying air under a predetermined pressure,
a valve body having a passage connecting the air supply means to the inlet port of the cylinder,
a valve closure member slidable in the valve body for restricting the passage,
and lost motion means operable by the piston for moving the valve closure member to a fully open position at the end of each work stroke of the piston and for moving the valve closure member in a closing direction at the end of the return stroke of the piston.

References Cited by the Examiner

UNITED STATES PATENTS 2,101,018 12/37 Bebinger.
2,214,755 9/40 Tafel.
2,825,955 3/58 Ede _____ 91—50 X

FOREIGN PATENTS 210,209 8/07 Germany.
296,848 11/15 Germany.

SAMUEL F. COLEMAN, *Primary Examiner.*

EDWARD A. SROKA, *Examiner.*